March 25, 1941.　　　L. C. LEDERER　　　2,236,002
HARVESTER
Filed Aug. 27, 1938　　　7 Sheets-Sheet 2
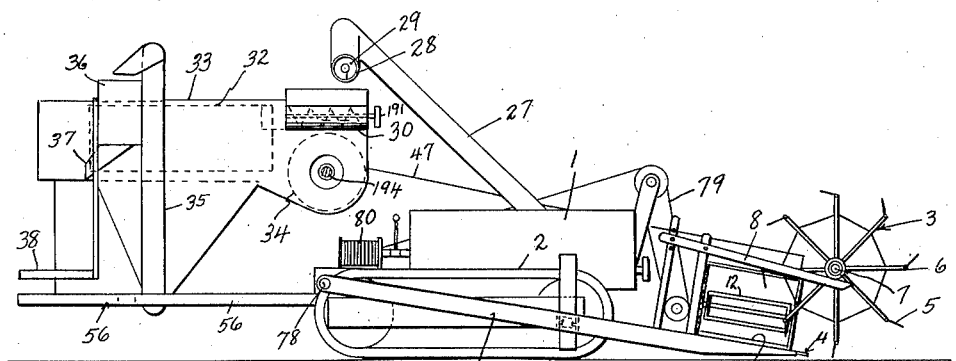
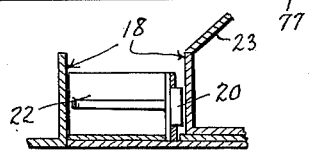
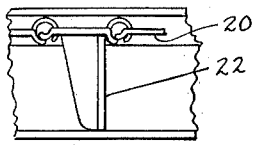
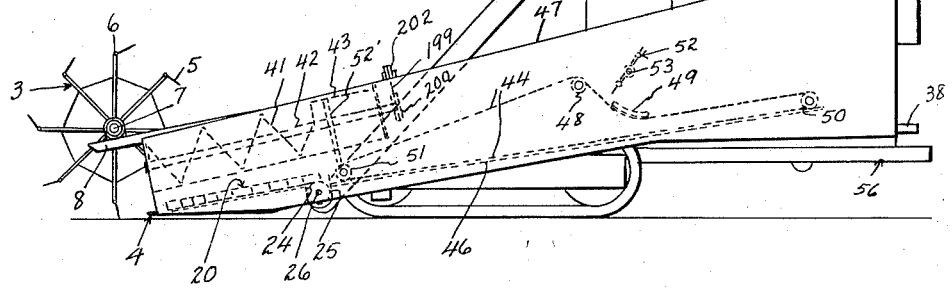
INVENTOR.
LESTER C. LEDERER
BY
Boyken & Mohler
ATTORNEYS March 25, 1941.  L. C. LEDERER  2,236,002
HARVESTER
Filed Aug. 27, 1938  7 Sheets-Sheet 3

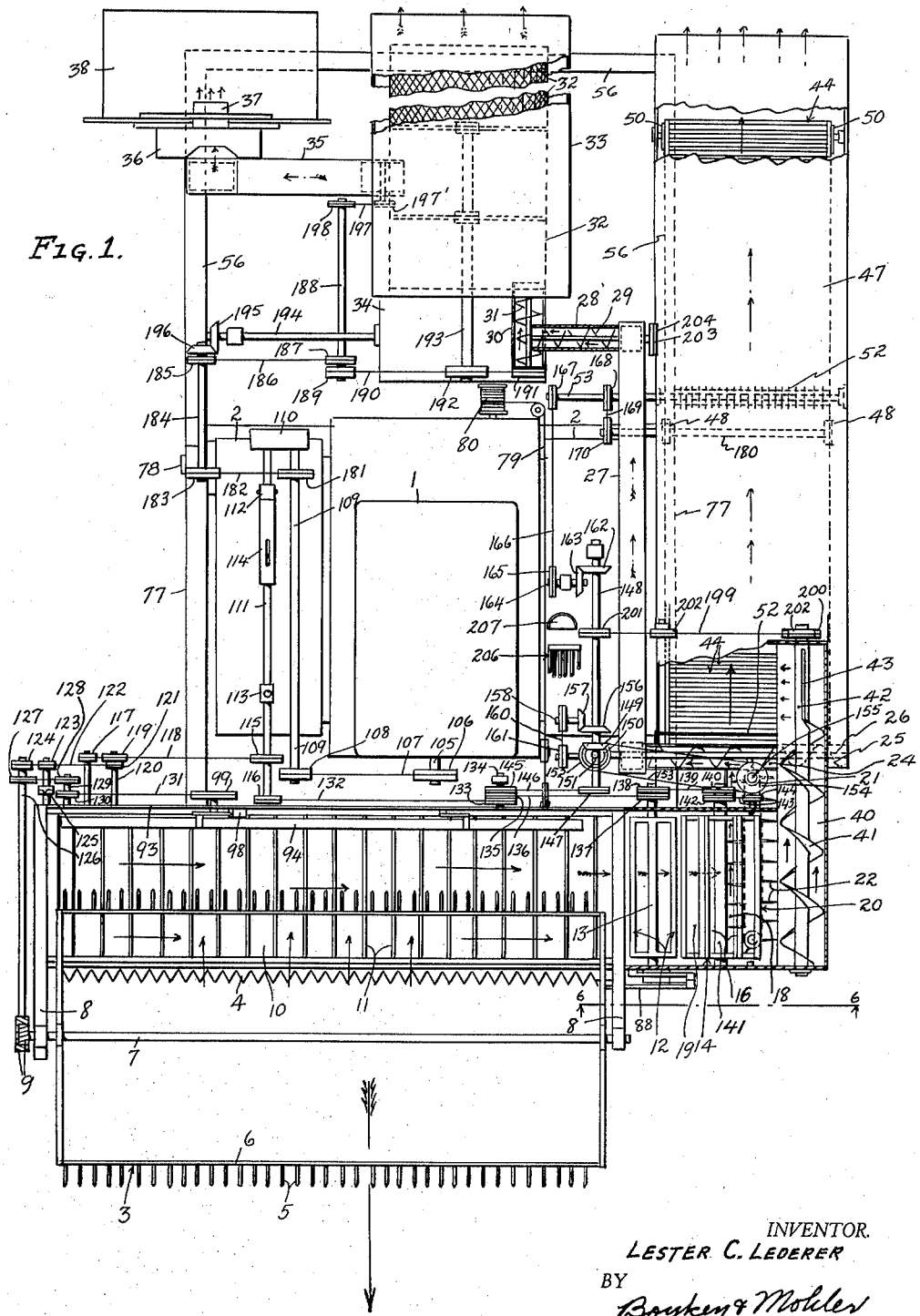

INVENTOR.
LESTER C. LEDERER
BY
Boyken & Mohler
ATTORNEYS

March 25, 1941.  L. C. LEDERER  2,236,002
HARVESTER
Filed Aug. 27, 1938  7 Sheets-Sheet 5

INVENTOR.
LESTER C. LEDERER
BY
Boyken & Mohler
ATTORNEYS

March 25, 1941.  L. C. LEDERER  2,236,002
HARVESTER
Filed Aug. 27, 1938  7 Sheets-Sheet 6
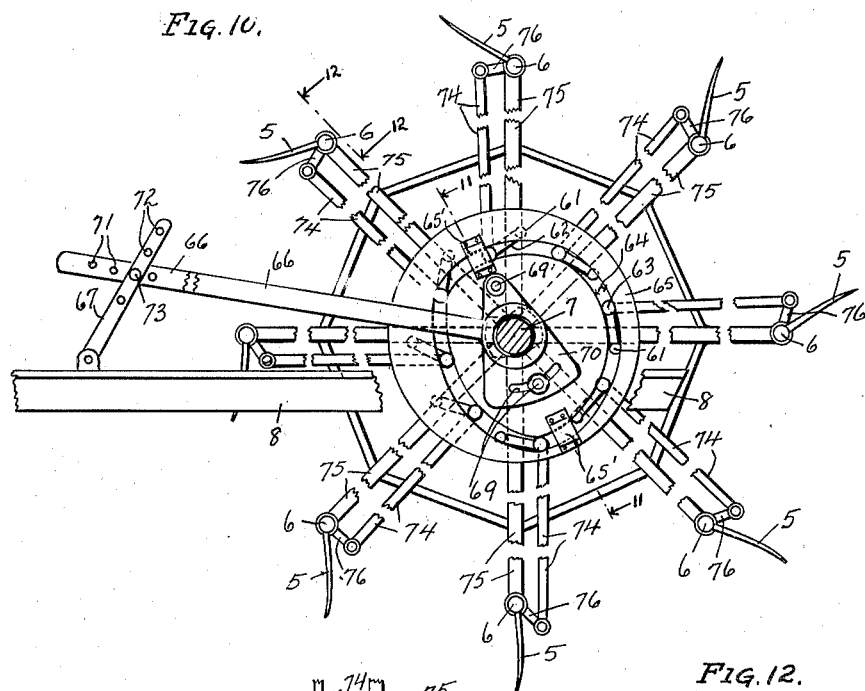
Fig. 10.
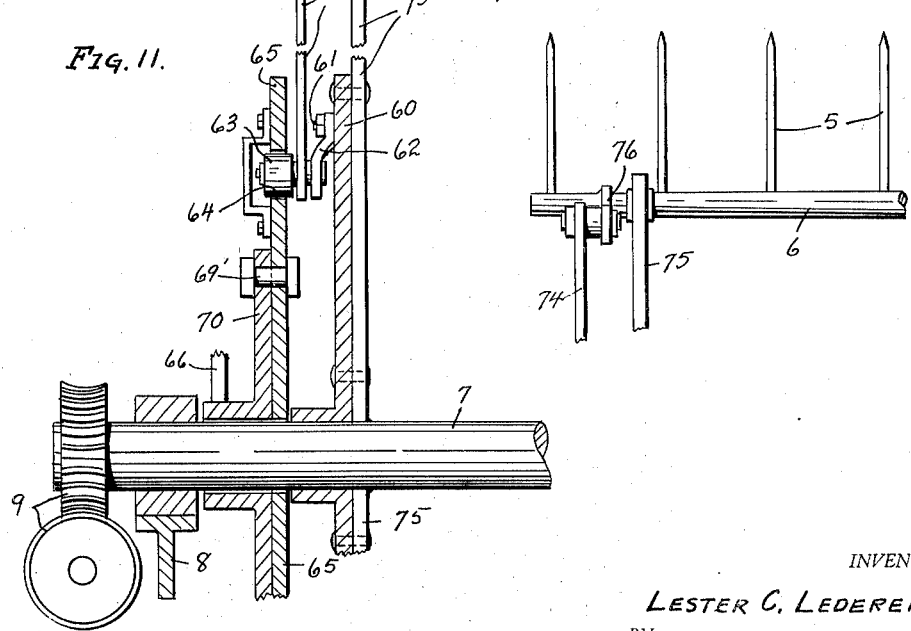
Fig. 11.
Fig. 12.
INVENTOR.
LESTER C. LEDERER
BY
Boyken & Mohler
ATTORNEYS.

March 25, 1941.  L. C. LEDERER  2,236,002
HARVESTER
Filed Aug. 27, 1938   7 Sheets-Sheet 7

INVENTOR.
LESTER C. LEDERER
BY
Boyken & Mohler
ATTORNEYS

Patented Mar. 25, 1941

2,236,002

UNITED STATES PATENT OFFICE 2,236,002

HARVESTER

Lester C. Lederer, Willows, Calif.

Application August 27, 1938, Serial No. 227,133

4 Claims. (Cl. 56—21)

This invention relates to harvesters and has for its objects the provision of a compact relatively light harvester, including a tractor adapted to carry the complete harvester unit, and which harvester is constructed to feed the straw directly to the threshing cylinder and to effect a change of direction of movement of the straw for ejection of the latter rearwardly of the harvester by improved means that eliminates the difficulties heretofore encountered in turning the straw itself to cause such movement. Another object is the provision of improved means for effecting a clean cutting of standing grain close to the ground for deposit of the cut grain onto the harvester, as where the stalks of standing grain have fallen over, and still further objects are the provision of a construction readily adapting the harvester to side hill use and to variations in surface contour. Other objects and advantages will appear in the annexed drawings and description.

In the drawings, Fig. 1 is a diagrammatic plan view of the harvester.

Fig. 2 is a simplified, semi-diagrammatic elevational view of the harvester from one side, and Fig. 3 is a semi-diagrammatic, simplified view of the harvester as seen from the other side, with certain elements omitted in both views for clarity.

Fig. 4 is an enlarged fragmentary sectional view of one of the elements of the grain conveyor as seen from line 4—4 of Fig. 7.

Fig. 5 is a plan view of the element of Fig. 4.

Fig. 10 is an end view of the reel carrying the pickers, the shaft being in section and the drive gears being omitted.

Fig. 11 is an enlarged sectional view of a portion of the reel generally as seen from line 11—11 of Fig. 10, showing the drive for the reel.

Fig. 12 is an enlarged elevational view of a portion of the reel as seen from line 12—12 of Fig. 10.

Figure 6:
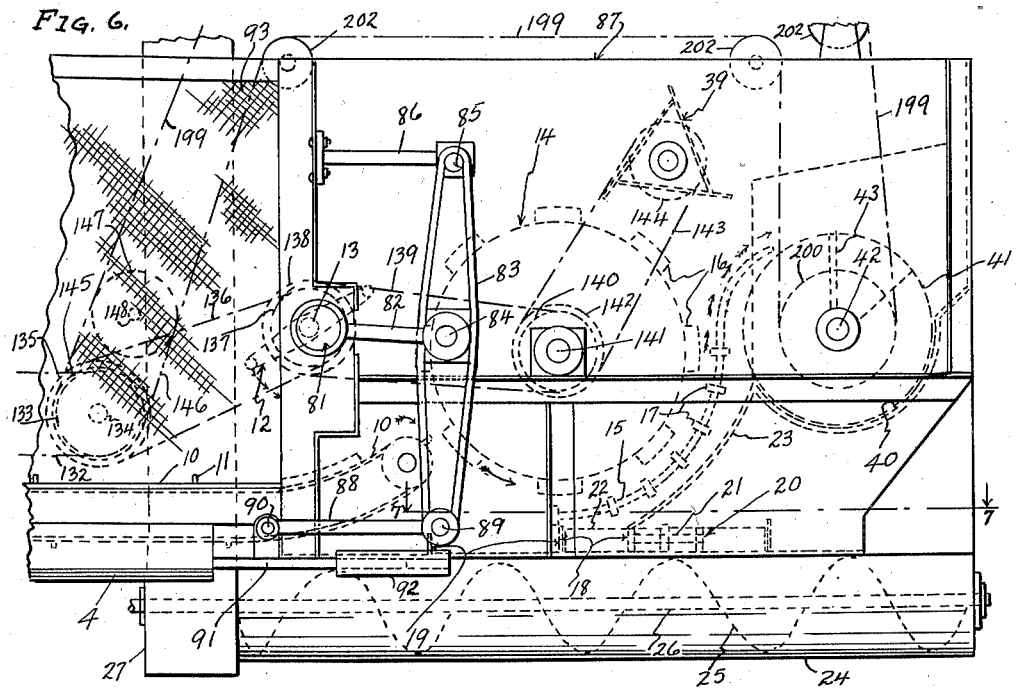
Fig. 6 is a front elevational view of a portion of the harvester as seen from line 6—6 of Fig. 1 with the elements within said portion indicated in dotted line.

In detail, referring to Figs. 1, 2, my harvester preferably comprises a tractor of track-laying type, having an engine 1, tracks 2 and a frame, 5 which frame supports the various elements of my harvester on the tractor, the power for driving the operating elements of the harvester being supplied by the tractor engine.

At the forward end of the harvester is a reel 3, generally designated extending transversely of the normal directional movement of the harvester, and forwardly of and above and parallel with a conventional elongated toothed sickle blade 4. The reel will be described later on in detail, (Figs. 10 to 12) and is merely diagrammatically indicated in Fig. 1. It is sufficient at this point to say that the reel carries rows of comb-like teeth 5 supported on bars 6 extending between the ends of a plurality of equally spaced spider-arms extending radially from rotating shaft 7, which shaft is rotatably supported at its ends in bearings on the outer ends of brackets 8 that project forwardly from the harvester, said shaft being driven by a helical-worm gear connection 9 (Figs. 1, 11) at one of its ends, the worm gear being driven from the engine as will later be described.

Behind the sickle blade, 4, and extending in a direction parallel therewith, is a horizontally disposed belt conveyor 10 provided with transverse slats 11 thereon. This conveyor receives the stalks cut by the sickle blade with said stalks extending transversely of the conveyor and generally in the direction of the slats on said conveyor.

The stalks, with the grain thereon, are carried horizontally to the right, and then upwardly, to below and close to a rotating lower beater 12 (Figs. 1, 6) provided with a pair of bars secured at their ends to radial arms carried by a rotatably mounted shaft 13, with which shaft said bars are parallel. The bars on said lower beater revolve around the shaft 13 in a direction to urge the grain stalks passing therebelow to below a second beater 14, which beater is conventional and here the grain is threshed from the heads and the stalks broken up by being urged by the main beater to between a row of spaced stationary rods 15 (Fig. 6), and the bars 16 of the beater. Said rods are curved to generally follow the circular path of movement of the beater bars 16, but spaced outwardly therefrom and said rods are connected by spaced cross bars 17 that extend parallel with said row of rods.

The grain separated from the stalks falls into a transversely extending compartment 18 (Figs. 6, 7, and also Fig. 1), which compartment has an open upper side so as to receive the falling grain, and which compartment is separated from the discharge end of conveyor 10 by a rock compartment 19 into which rocks or the like will fall before the grain passes to between the beater bars 16 and rods 15. This rock compartment is very important, and believed to be new, and is highly efficient in preventing undesirable foreign material such as dirt and rocks from passing into and past the grain receiving compartment.

Figure 7:
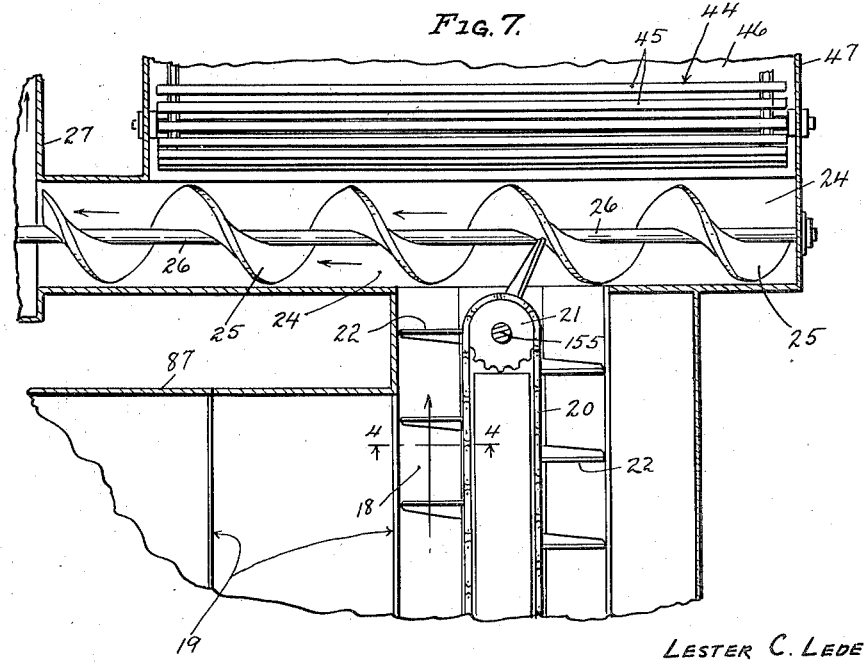
Fig. 7 is a sectional view taken of a portion of the harevester as seen from line 7—7 of Fig. 6.

Within said grain receiving compartment is an endless chain conveyor 20 passing around horizontal sprockets 21 at its ends which sprockets are mounted for rotation on vertical axes. The conveyor is provided with vertically disposed, horizontally elongated, spaced, plates 22 (Figs. 4, 5, 7) which conveyor and plates are moved horizontally and transversely of the directional movement of the stalks past the beater bars 16 in the direction of the arrow, (Fig. 7).

Referring to Fig. 6, it will be seen that curved plate 23 extends below the rods 15 and over one-half of the longitudinally extending runs of conveyor 20, so as to direct the falling grain into that portion of the grain receiving compartment in which the plates 22 are moved rearwardly only, relative to the forward end of the harvester, so that the grain falling into said compartment will be drawn by plates 22 rearwardly and at the rearmost end of the compartment 18 the blades pass horizontally over a horizontally disposed, semi-cylindrical, upwardly opening channel 24. Said channel 24 extends perpendicularly relative to the compartment 18, and within channel 24 is a screw conveyor 25 mounted on a revolving shaft 26 (Fig. 7) which screw is moved in a direction to move grain deposited thereon to the left, as seen in Fig. 1, and as indicated by the arrow in Figs. 1 and 7.

Figure 8:
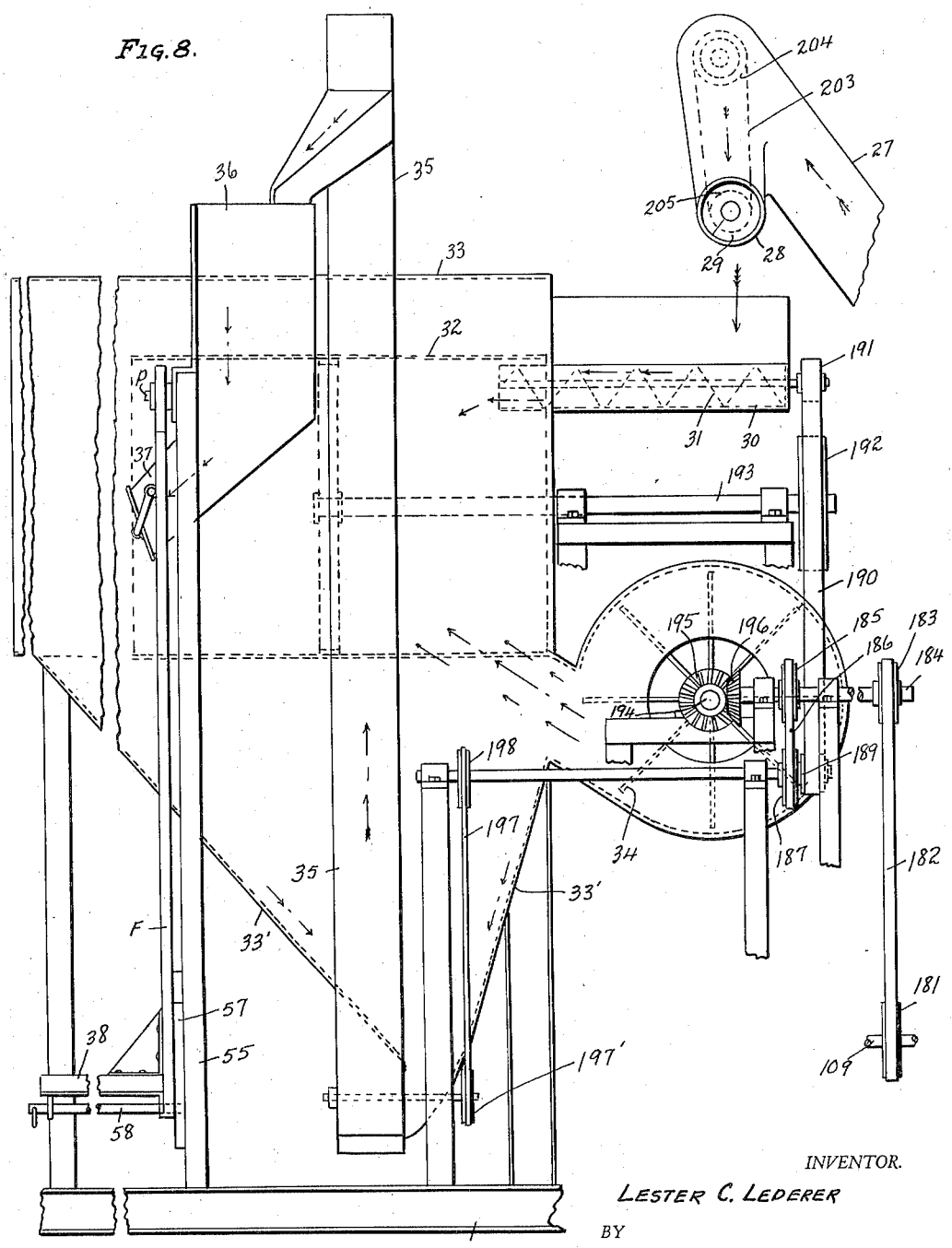
Fig. 8 is an elevational fragmentary view of a portion of the harvester showing the upper end of the grain elevator, and the cleaner and grain discharge chute, including other elements associated with the cleaner.

The grain in channel 24 is caused to move into the lower end of a grain elevator 27, provided with the usual endless conveyor and buckets or blades thereon for carrying the grain up the conveyor for discharge at the upper end thereof into one end of a horizontally extending cylinder 28 (Figs. 1, 2 and 8). Within cylinder 28 is a second screw conveyor 29, and the grain dropping into said one end of the cylinder 28 is moved horizontally by the conveyor out of the opposite end for dropping into the upper open side of a semi-cylindrical horizontally extending channel 30 within which is a horizontally extending screw conveyor 31. Said conveyor 31 is adapted to move in a direction to move the grain falling into channel 30 out of an end thereof into the forwardly open end of an open ended, horizontally disposed revolving cylindrical, cleaner screen 32. A casing or shell 33, extending longitudinally of cylindrical screen 32 generally encloses the screen, and air is blown upwardly through said casing and through said screen and out of its rearwardly open end of the casing by a blower 34 which cleans the grain of dust and chaff (Fig. 8).

Figure 9:
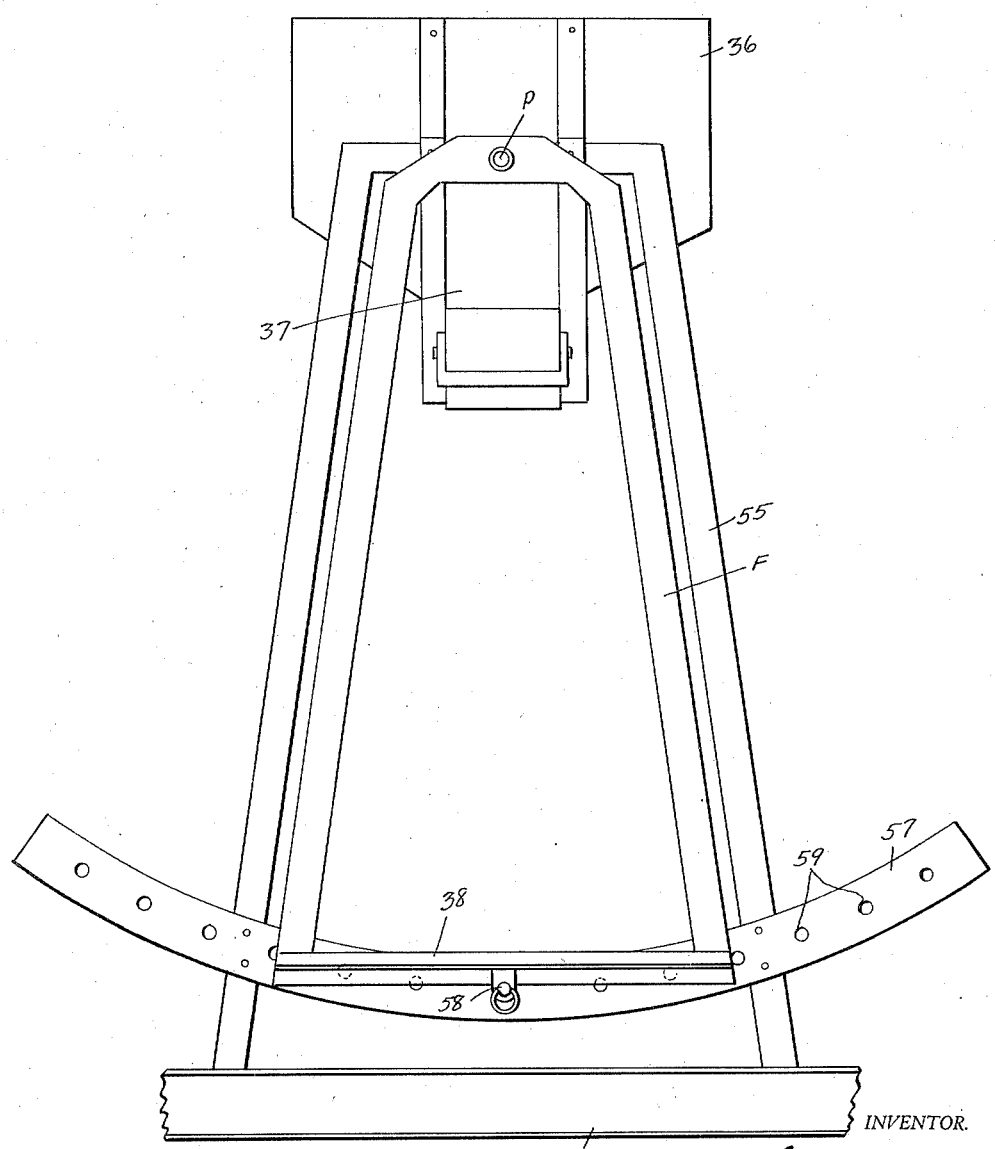
Fig. 9 is an elevational view of the grain sacking platform where the grain is received for sacking from the grain discharge chute, or hopper.

The grain falls through the revolving screen of the cylinder onto the lower side 33' of casing 33, which lower side is formed to provide a downwardly converging side so as to conduct the cleaned grain from an opening in the lower end of said casing into the lower end of a second grain elevator 35 (Fig. 8), which elevator has a conventional endless conveyor therein adapted to carry the cleaned grain to the upper end of said elevator and to discharge the grain from said upper end into a grain receiving hopper 36, from which the clean grain is drawn, as desired, through a gate closed chute 37 for sacking by an operator positioned on a platform 38 at the rear of the harvester (Figs. 8, 9).

The foregoing completes the course of movement of the grain after being threshed from the stalks by operation of the beater assembly.

Returning now to the movement of the broken straw from which the grain has been threshed. A rotating stripper device 39 (Fig. 6) over the main beater to prevent the straw from being carried around the main beater. The straw is then carried below and past the main beater, and over rods 15 into an upwardly opening, horizontally extending, partially cylindrical channel 40, within which channel is a relatively large screw conveyor 41 secured on shaft 42, which conveyor is adapted to move the straw discharged into said channel rearwardly. This is an important feature, since heretofore considerable difficulty has been experienced in forcing the straw around a bend to carry it rearwardly before it has gone through and been broken up by beater 14; whereas with my construction no such difficulty is encountered, since the long stiff stalks have been broken up, and the change in direction being made without any difficulty.

At the rear end of the shaft 42, and rearwardly of the screw blade of the conveyor, I provide a straight, rearwardly extending blade 43 (Figs. 1 and 6), which blade is secured to said shaft 42 and parallel therewith. After the straw is forced past the rear end of the screw blade it is engaged by the revolving blade 43, which throws the straw radially of shaft 42, and scatters it over the rear end of a rearwardly extending slat conveyor 44, (Figs. 3 and 7). While this conveyor is termed a "slat conveyor," instead of conventional slats on a belt, I use tubes 45 (Fig. 7), which are spaced apart, but relatively close together, so that any grain that might still be in the straw will fall through the spaces between the tubes and onto the bottom 46 of a generally rearwardly extending large, tubular housing 47 (Fig. 3) that encloses both the screw conveyor 41 and the slat conveyor 44. The upper run of said slat conveyor 44 extends upwardly from its end adjacent the screw conveyor, at a steeper angle than the lower run, but about intermediate its ends, said upper run extends over a drive sprocket 48 (Fig. 3) and then downwardly below curved side guide strips 49 that extend over opposite edges of the conveyor, and from said guide strips the upper run extends again directly rearwardly and generally parallel with the lower run to over rear sprocket 50 where the lower run slidably extends over bottom 46 back to the forward sprocket 51, dragging any grain on said bottom 46 to channel 24 (Fig. 3). A comb-like, rotating stripper 52 mounted on shaft 53 extends across the upper run of the conveyor where said run passes downwardly to below guides 49 for further scattering the straw on the conveyor and to loosen any grain that may still be in said straw.

At the forward end of the slat conveyor is a generally upwardly extending wall 52' (Fig. 3) that is provided with an opening at its lower end adjacent the forward end of the conveyor 44, to prevent straw from passing forwardly on the upper rim of the conveyor into channel 24, while permitting the grain on bottom 46 to pass back into said channel, and the rear end of the large housing 47 is open to permit discharge of the straw from the upper run of the straw conveyor 44.

The foregoing completes the operations for handling the straw after the grain has been threshed therefrom.

The platform 38 for supporting the operator who sacks the grain has already been mentioned and this platform is believed to be novel, and permits the sacking operation without difficulty, even when the harvester is on a relatively steep side hill.

In Fig. 9 the platform is shown more in detail, and which platform is supported, like a pendulum, from a vertically extending frame F that is pivotally connected by a horizontal pivot P with a stationary frame 55, which latter frame is supported on a frame 56 rigid with the tractor. Frame 55, 56 also serves to support the grain hopper 36. An arcuate segment 57 at the lower end of frame 55 is secured thereto, and a longitudinally sliding pin or rod 58, carried by the platform 38, is adapted to fit in any one of the holes 59 formed in said segment.

Thus, should the tractor be on a steep hillside, the platform 38 may be released by drawing pin from its hole 59 in said segment, thus allowing the platform to swing to substantially horizontal, when the pin can again be inserted in one of holes 59 for locking the platform in the newly adjusted position.

The reel carrying the picker teeth 5 is also believed to be of novel construction, and so shown more in detail in Figs. 10 to 12.

As has been stated, brackets 8 support the reel at its ends, and the reel shaft 7 is rotatably supported on said brackets, and is driven by the helical-worm drive connection 9.

Secured to the end of the shaft adjacent its driven end is a disk 60 (Fig. 11) provided with a generally annular row of pivots 61, each pivotally mounting one end of relatively short links 62.

The opposite end of each of the links 62 carries a roller 63 adapted to roll in a cam track or slot 64 in a plate 65, which plate 65 is secured against rotation by an arm 66, that adjustably connects at its end remote from plate 65 with a second arm 67 secured to the bracket 8. The connection between the end of arm 66 adjacent plate 65 is through slot and bolt connection 69 and pivot connection 69' between plate disk 70 secured on said end of arm 67 and the plate 65, said disk 70 carrying an arcuate slot and plate 65 carrying the pivot 69' and the bolt 69, which bolt extends through said slot. The shaft 7 mounting the reel itself passes generally centrally through openings in the plate 65 and disk 70.

The adjacent or connecting end portions of arms 66, 67 are each provided with a row of openings 71, 72 respectively, and a bolt 73 passing through any pair of registering openings secures the arms together in any desired position of adjustment.

The axles or shafts supporting rollers 63 also mount the inner ends of arms 74, which arms extend generally radially outwardly of shaft 7 and alongside a plurality of the equally spaced radial arms 75 extending radially outwardly of shaft 7, and which latter arms are secured to said shaft.

The opposite end of shaft 7 is provided with arms similar to arms 75 and disposed in opposed relation thereto. Rotatably supported in bearings at the outer ends of arms 75, are the ends of the bars 6, each of which bars carries a row of spaced picker teeth 5 thereon and projecting outwardly thereof and a link 76 secured at one end to bar 6 is pivotally connected at its opposite end to arm 74.

The foregoing construction is to enable a quick and relatively simple adjustment for varying the angle of inclination between the picker teeth and the axis of shaft 6 so as to facilitate the freeing of the picker teeth from the grain cut by the sickle blade, and to also give said teeth the most efficient inclination and position during and immediately preceding the cutting of the grain by said blade.

With the adjustment shown in Fig. 10 the picker teeth 5 will engage the stalks of grain relatively close to the ground and will pick them up and direct them to positions extending transversely of the sickle blade and over the belt conveyor 10, but when the stalks are over the conveyor, said teeth will remain generally vertical during their movement upwardly and over the conveyor so as to free the stalks from the teeth. As the teeth again approach the "picking" position, they will again gradually move to generally radially extending positions relative to the axis of shaft 7 to again engage the uncut grain.

By loosening the bolts at the slot and bolt connection 69, and by rotating plate 65 relative to pivot 69' and again tightening the connection, the movement of the picker teeth may be changed so that they literally "scoop" the grain stalks from the ground, or the reverse, and also, by adjusting the connection between the adjacent ends of arms 66, 67, the point where the picker teeth commence to change their inclination relative to the axis of shaft 7 can be varied. Brackets 65' connect plate 65 at opposite sides of slot 64.

In Fig. 2 is shown one of the frame members 77, which members are at opposite sides of the tractor and support the elements of the harvester, except for the grain cleaner, blower, elevator 35 and conveyor 31, which are supported on a frame that is rigid with the tractor, such as indicated at 56 in Figs. 2, 8. The frame members 77 are pivoted at 78 at their rear ends, to the frame that is rigid on the tractor, and the forward ends of said side frame members are free to swing vertically by operation of a cable 79 passing over conventional sheaves to a hoisting drum 80 that is power operated from the tractor engine by any suitable transmission gear connection. Thus the harvester proper swings on said horizontal pivots 78 to any desired degree of elevation, and consequently the sickle blade may be moved vertically, up and down about said pivots 78 as desired to accommodate itself to the contour of the terrain or to the grain.

In Fig. 6 the sickle blade driving connection is illustrated, and which driving connection comprises an eccentric connection 81 between shaft 13 that mounts the lower beater 12. A connecting rod 82 extends from said eccentric connection to a point about midway between a generally vertical rocker arm 83 to which the rod 82 is connected by a pivot 84. The upper end of said rocker arm is pivotally secured at 85 to the end of an arm 86 that is rigidly secured to the beater housing 87. A link 88 is pivotally connected at one end to the lower end of the rocker arm by a pivot 89, while the opposite end of link 88 connects by pivot 90 with an extension 91 of the sickle blade 4. Said extension of the sickle blade is supported in a rigid hollow tubular guide 92 rigid with the housing 87.

Vertically extending upwardly from adjacent the edge of the conveyor 10 that is opposite the sickle blade, I provide a vertical screen 93 (Figs. 2, 13 and 14), which screen extends substantially the length of the sickle blade and the conveyor. Adjacent the forward side of said screen and spaced above and over the conveyor, I provide a horizontally extending bar 94, which bar is mounted on hangers 95, 95' for oscillating bodily horizontally in a generally circular path of travel.

Figure 13:
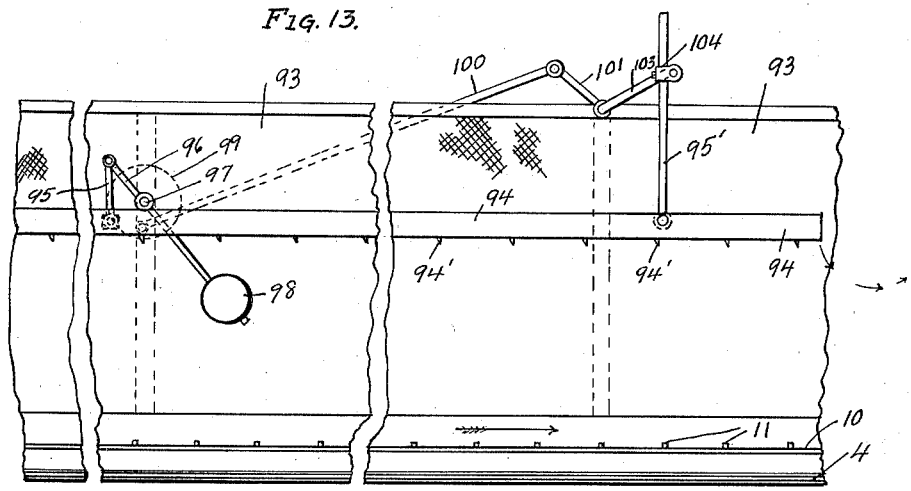
Fig. 13 is a front elevational fragmentary view of a portion of the forward end of my harvester.
Figure 14:
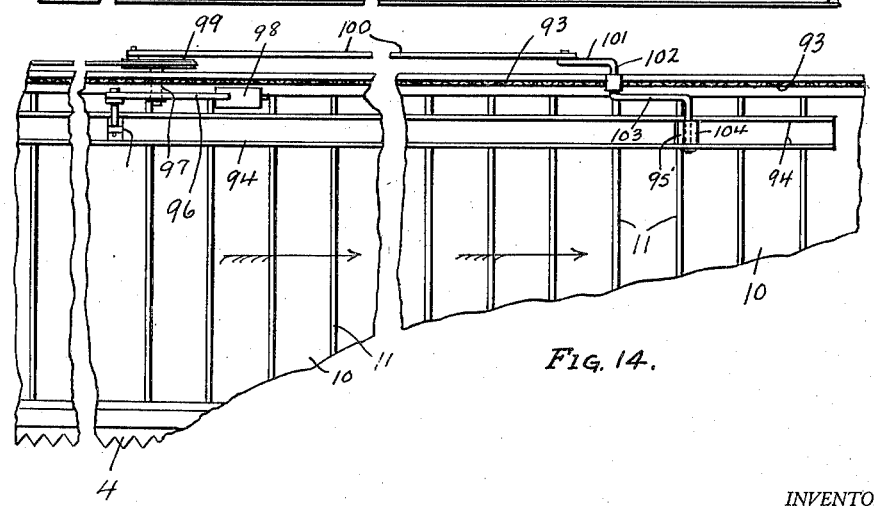
Fig. 14 is a plan view of the same portion.

As shown in Figs. 13, 14 the bar 94 will move in a circular path of travel in the direction of the arrow and will tend to force the cut grain stalks downwardly toward the conveyor and toward the beaters.

These movements are accomplished by pivotally supporting the left-hand hanger 95 from one end of a rod 96, which rod is secured at a point intermediate its ends to a rotating shaft 97 while the opposite end of the rod on the opposite side of the shaft carries a counterweight 98. Shaft 97 passes horizontally to the opposite side of screen 93 where a chain driven sprocket 99 thereon, suitably connected to the tractor engine through intermediate connections (Fig. 1) is driven to cause the bar 94 to revolve in a vertical plane. The connection between hanger 95 and the bar 94, is rigid.

A connecting rod 100 (Figs. 13, 14) is pivotally connected at one end to sprocket 99 and at the opposite end to one end of crank arm 101. The opposite end of crank arm 101 is connected with a shaft 102 that extends to the forward side of screen 93 where it connects with a second crank arm 103, the outer end of which latter arm pivotally supports hanger 95, which hanger is adjustably secured to the said outer end of arm 103 by a clamp 104.

The various drive connections are best shown in the diagrammatic view, Fig. 1, wherein power shaft 105 from the engine is provided with a sprocket 106 that connects by chain 107 with sprocket 108 on one end of shaft 109. The opposite end of shaft 109 is connected through transmission gears in box 110 with one end of shaft 111. The shaft 111 is provided with universal joints at 112 and 113 and spline at 114, so as to enable the shaft to swing with the frame mounting the sickle bar and other elements as previously described.

On the outer end of shaft 111 is a sprocket 115 and a sprocket 116. Sprocket 115 connects with a sprocket 117 by chain 118, and also drives a sprocket 119, which latter sprocket drives shaft 120 on which is secured a sprocket 121 which connects by a chain 122, said chain 122 driving sprockets 123, 124. The sprocket 123 is on the driving shaft that drives the conveyor 10 and a connectional manually actuated clutch 125 enables the connecting and disconnecting of the drive to the conveyor as desired. Sprocket 124 is on shaft 126 which drives the worm gear of the worm-helical gear connection which drives the reel shaft 7.

Said shaft 126 also carries a sprocket 127 that is connected by a chain with sprocket 128 on a shaft 129 which shaft carries sprocket 130 that connects by chain 131 with sprocket 99 for driving bar 93.

The sprocket 116 on the end of shaft 111 connects by a chain 132 with sprocket 133 that is secured on a rotatably mounted shaft 134. A second sprocket 135 secured on shaft 134 connects by chain 136 with a sprocket 117 secured to beater shaft 13 for driving the lower beater and sprocket 138 on the same shaft 13 connects by chain 139 with a sprocket 140 on the shaft 141, which mounts the main beater 14 while sprocket 142 on the same shaft 141 connects by chain 143 with sprocket 144 that drives the stripper 39. Fig. 6 also clearly illustrates the chain and sprocket connections from 132 to 144 inclusive as seen at right angles to the connections illustrated in Fig. 1.

On the shaft 134 is a third sprocket 145 that connects by chain 146 with a sprocket 147 that is secured on one end of shaft 148. Shaft 148 carries a bevel gear 149 that drives a bevel gear 150 carried on a vertical shaft 151, which vertical shaft carries a pulley 152 connected by a belt 153 with a pulley 154 on shaft 155, said shaft 155 driving the sprocket 21 which mounts one end of the endless gear conveyor 20.

Shaft 148 also carries a second bevel gear 156 which meshes with bevel gear 157 on a horizontal shaft 158. A sprocket 159 on shaft 158 connects by chain 160 with sprocket 161, which sprocket is secured on the end of shaft 26 that carries the screw conveyor blade 25 and which shaft also mounts the lower pulley or sprocket of the grain elevator conveyor 27.

On shaft 148 is a third bevel gear 162 that meshes with bevel gear 163 secured on shaft 164. Shaft 164 also carries a sprocket 165 connecting by chain 166 with sprocket 167, which sprocket 167 is on the shaft 53 that mounts the bars 52. A sprocket 168 on shaft 53 connects by chain 169 with sprocket 170 that drives shaft 180 mounting the straw conveyor sprockets 48.

Referring back to shaft 109 that is driven from the main engine shaft 105, said shaft 109 carries a sprocket 181 that connects by chain 182 to drive sprocket 183 for driving shaft 184 on which sprocket 183 is secured and a sprocket 185 on said shaft 184 connects by chain 186 with a sprocket 187 to drive said latter sprocket.

Sprocket 187 is secured on a rotatably mounted shaft 188, which shaft also carries a pulley 189 that connects by belt 190 with a pulley 191, which pulley 191 is secured on the screw conveyor shaft of conveyor 31 to drive the latter. The belt 190 also passes over a pulley 192, which pulley revolves shaft 193, on which it is mounted, and which shaft 193 carries the screen 32 for revolving with the shaft.

The blower 34 is actuated by shaft 194, said shaft 194 having a bevel gear 195 secured thereto, said bevel gear meshing with a bevel gear 196 carried on shaft 184.

The elevator conveyor in elevator 35 is actuated from shaft 188 by means of chain 197 connecting between the sprocket 197' on the conveyor shaft and sprocket 198 on shaft 188.

The main straw conveyor 41 is revolved by means of chain 199 connecting between sprocket 200 that is on the outer end of said conveyor shaft and a sprocket 201 secured on shaft 148. Said chain extends upwardly from sprocket 200 to the upper side of the housing 47 where it passes over idler sprockets 202, as best indicated in Figs. 3, 6.

The grain screw conveyor 29 at the upper end of the elevator 27 is driven by a chain 203 connecting between a sprocket 204 on the shaft mounting the upper end of the conveyor that is in the elevator, and a sprocket 205 on the shaft of the screw conveyor 29, as best seen in Fig. 8.

The foregoing completes the description of the various driving connections for the elements of the harvester, a conventional series of operating levers for controlling the movement of the tractor and the elements, as desired, being indicated at 206, which levers are accessible to a driver on the seat 207.

The elements illustrated in Fig. 1 are, of course, set out diagrammatically, but relatively accurate as to their positions, and it is manifest that changes in proportions, arrangement, and construction of the driving connections may be made as found desirable, the principal object being that the elements are actuated as heretofore explained in describing the various elements.

Briefly reviewed, it will be seen from the foregoing description that my improved harvester in operation eliminates the trouble in changing direction of the movement of the grain stalks, since there is no bending of the stalks in making said change. Also the construction shown eliminates a great amount of weight found in conventional harvesters as well as eliminating many of the parts found in conventional harvesters.

The mounting of the harvester on a tractor, as described, with the weight thereof fore and aft of the tractor fairly equally balanced, facilitates handling the tractor in normal operation as well as making it much easier to handle it in making short turns in small fields or around creeks or on hillsides. Since the header is in front of all trucks or wheels, the standing grain is not injured or lost, as where tractors or the like are ahead of the harvester. The arrangement of the sickle blade provides a very close running blade adapted to lie close to the ground or is readily adjustable to various heights, together with the conveyor adjacent thereto.

Having described my invention, I claim:

1. In a grain harvester of the character described, cutting means for cutting a swath of grain bearing stalks from the ground, elongated conveyor means positioned adjacent said cutting means for supporting and moving the cut stalks longitudinally of the conveyor means away from said cutting means for discharge of the cut stalks from one end of said conveyor means, a rock compartment defined by lateral sides, a bottom and an open top below said one end of the conveyor means for receiving rocks and relatively heavy impurities from said one end of the conveyor, and grain threshing means adjacent said one end of the conveyor arranged and adapted to engage the cut stalks for threshing the grain therefrom, said rock compartment being disposed between said threshing means and said one end of the conveyor, whereby rocks dropping into said compartment are removed from stalks passing to the threshing means.

2. In a combined harvester having a thresher, a separator, and a grain conveyor; conveyor means on the harvester for carrying unthreshed material to the thresher, guide means on the harvester positioned between said thresher and separator for directing the threshed material from the thresher to the separator, separate means on the harvester extending from said thresher and from said separator for conducting grain from said thresher and from said separator respectively, to said grain conveyor separate from the material from which the grain is threshed.

3. In a combined harvester, a thresher, a grain separator, a grain conveyor, a rock separator, means for carrying unthreshed material to the thresher, said rock separator comprising an upwardly opening compartment disposed between said means and said thresher over which the unthreshed material is moved to the thresher, movable means positioned between the thresher and grain separator arranged and adapted to carry the threshed material from the thresher to the grain separator, means for so moving said movable means, and means for carrying the grain separated from the threshed material to said grain conveyor for movement of the grain away from the material from which the grain is threshed.

4. In a combined harvester, a thresher cylinder rotatable about an axis extending transversely of the direction of movement of stalks on said conveyor arranged and adapted to thresh the grain from said stalks and to break the stalks into pieces, means for rotating said cylinder, a separator for separating the grain from the said pieces after threshing by the thresher, a screw conveyor positioned with its axis extending parallel with the axis of the thresher arranged and adapted to receive said pieces from the thresher with grain mixed therewith and to move said pieces and grain rearwardly relative to the normal directional movement of the machine away from said thresher, and means connected with said screw conveyor for rotation therewith at the end thereof remote from the thresher arranged and adapted to throw said pieces and grain onto the separator and to relatively widely scatter said pieces and grain upon discharge from the screw conveyor upon rotation of said conveyor to facilitate separation of the grain from said pieces by said separator, means for rotating said screw conveyor.

LESTER C. LEDERER.